United States Patent
Cho

(10) Patent No.: US 9,058,154 B2
(45) Date of Patent: Jun. 16, 2015

(54) WINDOW SUBSTRATE AND DISPLAY DEVICE HAVING THE SAME

(75) Inventor: Daihan Cho, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 403 days.

(21) Appl. No.: 13/469,672

(22) Filed: May 11, 2012

(65) Prior Publication Data

US 2013/0058128 A1    Mar. 7, 2013

(30) Foreign Application Priority Data

Sep. 7, 2011    (KR) .................. 10-2011-0090912

(51) Int. Cl.
 *F21V 13/02* (2006.01)
 *G06F 1/16* (2006.01)
 *G06F 3/041* (2006.01)

(52) U.S. Cl.
 CPC ............ *G06F 1/1626* (2013.01); *G06F 1/1643* (2013.01); *G06F 1/1671* (2013.01); *G06F 3/041* (2013.01)

(58) Field of Classification Search
 CPC ... G06F 1/1626; G06F 1/1643; G06F 1/1671; G06F 3/041
 USPC ....................... 345/173; 349/58, 61; 359/601; 362/97.1, 293, 602
 See application file for complete search history.

(56) References Cited

U.S. PATENT DOCUMENTS

| | | |
|---|---|---|
| 2008/0117635 A1 | 5/2008 | Chen |
| 2010/0273530 A1 | 10/2010 | Jarvis et al. |
| 2011/0242058 A1 | 10/2011 | Lee et al. |
| 2011/0242465 A1 | 10/2011 | Lee et al. |
| 2011/0255227 A1* | 10/2011 | Murakami ............... 361/679.01 |

FOREIGN PATENT DOCUMENTS

| | | |
|---|---|---|
| CN | 1848328 A | 10/2006 |
| KR | 10-2006-0025616 A | 3/2006 |
| KR | 10-2009-0032269 A | 4/2009 |
| KR | 20-2010-0004485 | 5/2010 |
| KR | 10-2010-0068570 | 6/2010 |
| KR | 10-2011-0040453 | 4/2011 |
| KR | 10-1048931 B1 | 7/2011 |
| KR | 10-1048974 B1 | 7/2011 |
| WO | WO 2009/013026 A1 | 1/2009 |

* cited by examiner

*Primary Examiner* — Stephen F Husar
(74) *Attorney, Agent, or Firm* — Christie, Parker & Hale LLP

(57) ABSTRACT

A window substrate for a display device includes a base substrate including a display region and a non-display region disposed adjacent to at least one portion of the display region, a light shielding layer on the base substrate and facing at least one portion of the non-display region, the light shielding layer having at least one opening, and a filter layer on the base substrate and facing the opening, the filter layer being adapted to transmit a portion of a light passing through the opening.

32 Claims, 6 Drawing Sheets

WINDOW SUBSTRATE AND DISPLAY DEVICE HAVING THE SAME

CROSS-REFERENCE TO RELATED APPLICATION

This U.S. non-provisional patent application claims priority under 35 U.S.C. §119 to Korean Patent Application No. 10-2011-0090912, filed on Sep. 7, 2011, in the Korean Intellectual Property Office, the entire disclosure of which are hereby incorporated by reference.

BACKGROUND

Aspects of embodiments of the present invention generally relate to a window substrate and a display device including the same.

Ongoing research has been performed on various display devices, such as television sets, navigation systems, computer monitors, game machines, and so forth.

The display devices are often configured to have a plurality of buttons for operating functions, for example, controlling a volume level or selecting a menu item. In conventional display devices, the display devices have been equipped with buttons in independent ways. Recently however, some display devices have been configured to include a touch panel which allows the buttons to be integrated onto one input plane.

The display devices having embedded touch panels include a window substrate including at least one input icon associated with a particular function. The device can be operated for a user's intended purpose by selecting an input icon associated with a desired function.

However in such display devices, the input icons are typically always perceivable by a user, regardless of an operation of the display device. For example, the input icons can be perceived by a user, even when the display device is in an off-state.

SUMMARY

Embodiments of the present invention provide a window substrate and a display device including the same. According to embodiments of the present invention, a window substrate is configured to display at least one input icon that can only be perceived by a viewer when the display is in a specific mode.

According to one embodiment of the present invention, a window substrate for a display device includes a base substrate including a display region and a non-display region adjacent to at least one portion of the display region, a light shielding layer on the base substrate and facing at least one portion of the non-display region, the light shielding layer having at least one opening, and a filter layer on the base substrate and facing the opening, the filter layer being adapted to transmit a portion of a light passing through the opening.

A display device according to example embodiments of the present invention may include a display panel configured to display an image, a housing configured to contain the display panel, a touch panel on the display panel, and a window substrate on the touch panel.

The filter layer may include a plurality of first particles adapted to block the incident light and a plurality of second particles adapted to transmit the incident light.

In some embodiments, the first particles and the light shielding layer have substantially the same color as each other. The first particles may be black, and a weight ratio of the first particles to the second particles may be in a range from 8:1 to 12:1. The first particles may be white, and a weight ratio of the first particles to the second particles may be in a range from 1.5:1 to 2.5:1.

The window substrate may further include a color layer interposed between the base substrate and the light shielding layer.

The first particles and the color layer may have substantially the same color as each other.

The window substrate may further include a color layer on the base substrate and adapted to filter a specific color of the incident light.

The base substrate may include a tempered glass or a reinforced plastic. The light shielding layer may be directly on the base substrate and may have substantially the same planar shape as the non-display region.

The display device may further include a light source portion in the housing and configured to generate the incident light. The light source portion may include a light emitting device adapted to generate an originating light and a light guide plate adapted to guide the originating light toward the window substrate, wherein the incident light includes a portion of the originating light emitted from the light guide plate.

BRIEF DESCRIPTION OF THE DRAWINGS

The accompanying drawings, together with the specification, illustrate exemplary embodiments of the present invention, and, together with the description, serve to explain the principles of the present invention.

FIG. 1 is an exploded perspective view of a display device according to one embodiment of the present invention;

FIG. 2 is a block diagram of the display device of the embodiment of the present invention shown in FIG. 1;

FIG. 3 is a perspective view illustrating the outward appearance of a window substrate displayed when operating the display device of the embodiment of the present invention shown in FIG. 1 in a first mode;

FIG. 4 is a cross sectional view taken along a line I-I' of FIG. 3;

FIG. 5 is a perspective view illustrating the outward appearance of a window substrate displaying an icon when operating the display device of the embodiment of the present invention shown in FIG. 1 in a second mode;

FIG. 6 is a cross sectional view taken along a line II-II' of FIG. 5;

FIG. 7 is an enlarged cross sectional view of a portion AA of FIG. 6;

FIG. 8 is a cross sectional view illustrating a portion of a display device according to other example embodiments of the present invention;

FIG. 9 is a cross sectional view illustrating a portion of a display device according to still other example embodiments of the present invention; and FIG. 10 is a cross sectional view illustrating a portion of a display device according to yet other example embodiments of the present invention.

Figure 1:
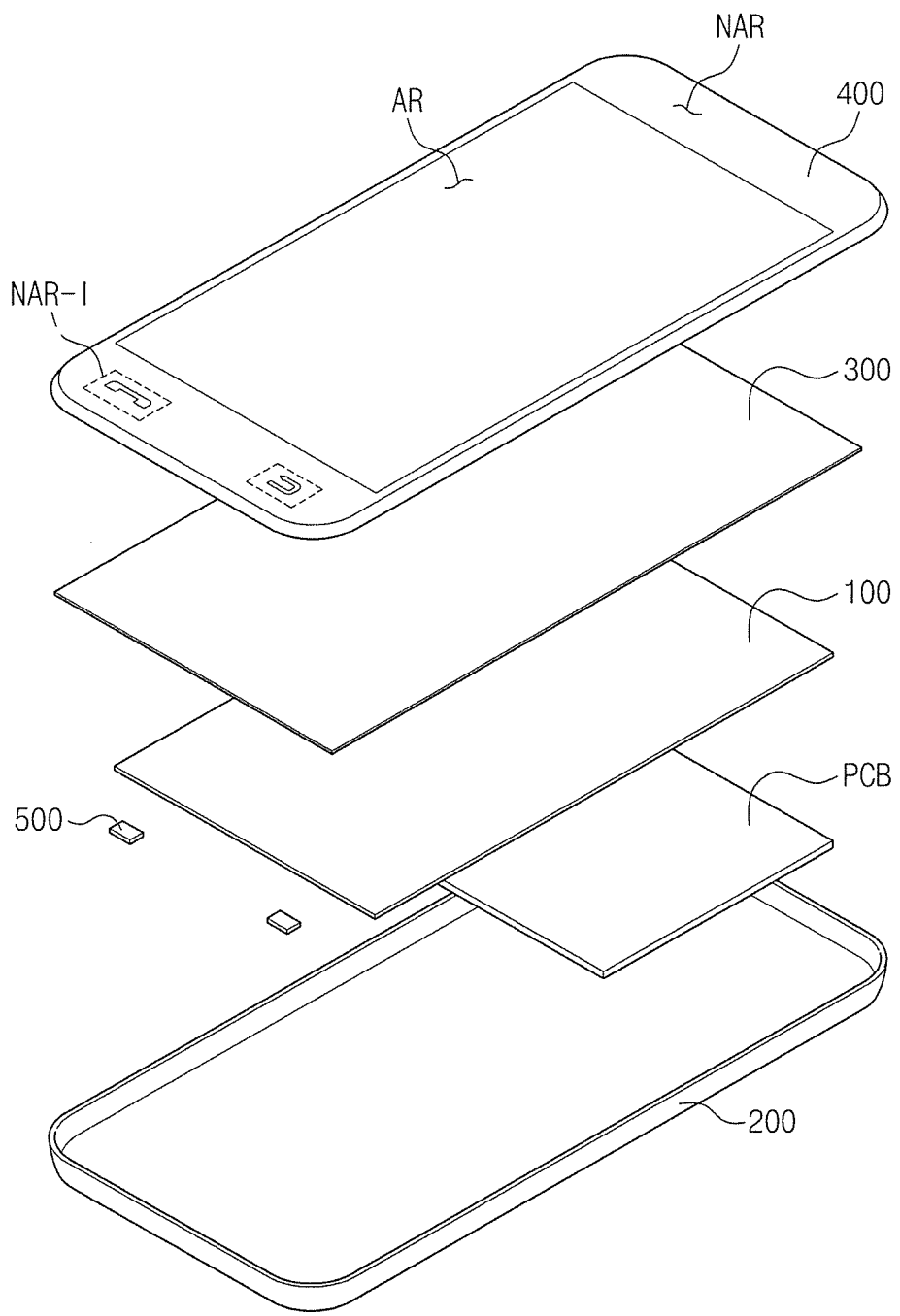
FIGS. 1 through 10 represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by embodiments of the present invention. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the present invention will now be described more fully with reference to the accompanying drawings, in which example embodiments of the present invention are shown. Embodiments of the present invention may, however, be embodied in many different forms and should not be construed as being limited to the embodiments set forth herein; rather, these embodiments are provided so that this disclosure will be thorough and complete, and will fully convey the concept of embodiments of the present invention to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. When an element is referred to as being "directly connected" or "directly coupled" to another element, there may be no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of embodiments of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of embodiments of the present invention. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the present invention are described herein with reference to cross-sectional illustrations that are schematic illustrations of idealized embodiments (and intermediate structures) of example embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of embodiments of the present invention.

Unless otherwise defined, all terms (including technical and scientific terms) used herein have the same meaning as commonly understood by one of ordinary skill in the art to which embodiments of the present invention belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
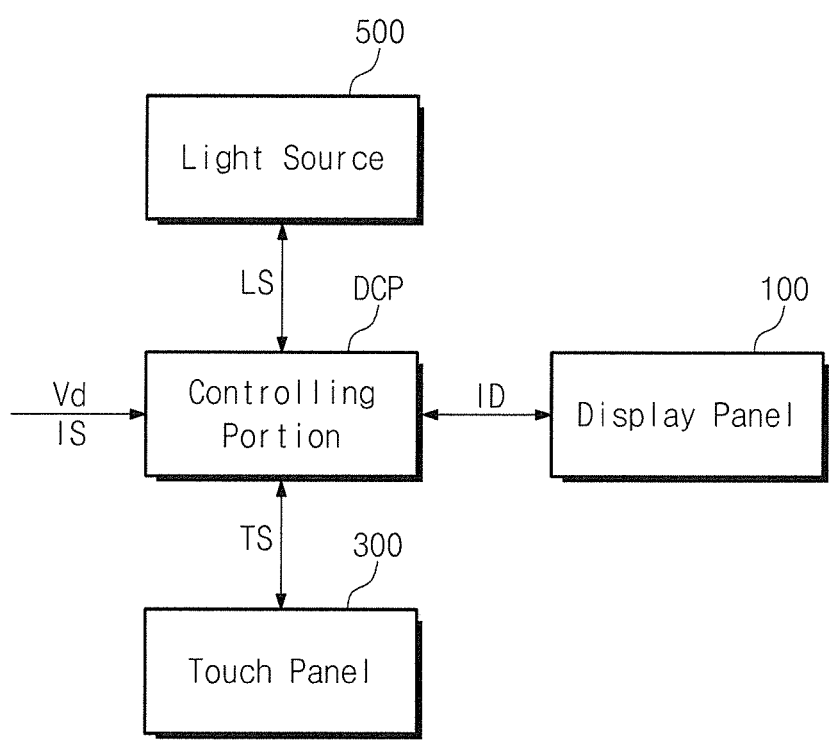

FIG. 1 is an exploded perspective view of a display device according to one embodiment of the present invention, and FIG. 2 is a block diagram of the display device the embodiment of the present invention shown in FIG. 1.

A display device according to example embodiments of the present invention may include a display panel 100, a housing 200 containing the display panel 100, a touch panel 300 disposed on the display panel 100, and a window substrate 400 disposed on the touch panel 300.

In some embodiments, as exemplarily shown in FIGS. 1 and 2, the display device may be a component of a cellular phone, but embodiments of the present invention may not be limited thereto. For example, the display device may be a component of one of various information service devices, such as a television set, a navigation system, a computer monitor, a game machine, and so forth.

The display panel 100 is configured to display an image. Embodiments of the present invention are not limited to a specific type of the display panel. For example, the display panel 100 may be one of various display panels, such as an organic light emitting display panel, a liquid crystal display panel, a plasma display panel, a electrophoretic display panel, an electrowetting display panel, and so forth.

The housing 200 is configured to contain the display panel 100. In some embodiments, as shown, for example, in FIG. 1, the housing 200 includes one substrate, but embodiments of the present invention are not limited thereto. For example, the housing 200 may include two or more substrates, which are joined to each other. Hereinafter, for the sake of convenience, embodiments of the present in which the housing 200 includes one substrate will be described.

In some embodiments, the housing 200 is configured to further include a printed circuit board (PCB) provided with a plurality of active devices and/or a plurality of passive devices in addition to the display panel 100. Furthermore, the housing 200 may further contain an electric power supplying portion, such as a battery.

The touch panel 300 is provided to obtain information on coordinates of a touch point, which will be input by a user. The touch panel 300 may be, for example, a resistive touch panel or a capacitive touch panel.

The resistive touch panel may be an analog resistive touch panel including two resistive layers spaced apart from each other or a digital resistive touch panel including first resistive patterns and second resistive patterns spaced apart from the first resistive patterns. The resistive touch panel may be configured to detect a variation of output voltage occurring when the two resistive layers or the first and second resistive patterns are in contact with each other by an external force, and the detected variation of output voltage may be used to calculate coordinate information of a touch point at which the external force is exerted.

The capacitive touch panel may include first sensing patterns and second sensing patterns electrically isolated from the first sensing patterns. Here, the first sensing patterns may be disposed to cross the second sensing patterns. The capacitive touch panel may be configured to detect a variation of electrical capacitance between the first and second sensing patterns occurring when the capacitive touch panel is touched by an input device (e.g., a stylus or a finger), and the detected variation of electrical capacitance may be used to calculate coordinate information of a touch point.

The window substrate 400 is disposed on the touch panel 300 and is joined to the housing 200 to form an exterior of the display device along with the housing 200. In some embodiments, the touch panel 300 may be joined to the window substrate 400.

In a plan view, the window substrate 400 may include a display region AR displaying an image generated by the display panel 100 and a non-display region NAR disposed adjacent to at least one portion of the display region AR.

The non-display region NAR may be configured to prevent an image from being outwardly displayed. In addition, in the embodiment shown in FIG. 1, the non-display region NAR includes an input icon region NAR-I. As will be described below, an opening 420-OP of a light shielding layer 420 may be formed in the input icon region NAR-I.

The display device may further include a light source 500 contained in the housing 200. The light source 500 may be configured to generate a light that will be supplied into (or through) the input icon region NAR-I. Furthermore, the light source 500 may be configured to supply the light into (or through) the input icon region NAR-I only when the display device is operated in a specific mode.

Hereinafter, an operating method of a display device according to example embodiments of the present invention will be described with reference to FIG. 2. A controlling portion DCP, as shown in FIG. 2, may be realized using the active devices mounted on the PCB previously described with reference to FIG. 1. One of the active devices may be a microprocessor configured to supply an image signal to the display panel 100. In addition, another of the active devices may be a microprocessor configured to calculate coordinate information of a touch point of the touch panel 300, at which an external input is exerted (or supplied, e.g., the point of the touch panel 300 or the window substrate 400 that a stylus or finger touches).

When an operation starting signal IS (e.g., pushing a power button is transmitted to the controlling portion DCP, the controlling portion DCP may operate the display panel 100 and the touch panel 300 using a power voltage Vd supplied from an external or internal power supplying device. The display panel 100 may display an image based on an image signal ID, which may be stored in a memory device or which may be transmitted (e.g., received) from an external device.

The controlling portion DCP may be configured to supply a light source operating signal LS to the light source 500. The light source operating signal LS may be generated on the basis of a coordinate information signal TS supplied from the touch panel 300.

Hereinafter, a term "first mode" will be used to refer to an operation mode of the display device in which the controlling portion DCP does not output the light source operating signal LS to the light source 500, and a term "second mode" will be used to refer to an operation mode of the display device, in which the controlling portion DCP outputs the light source operating signal LS to light source 500.

Figure 3:
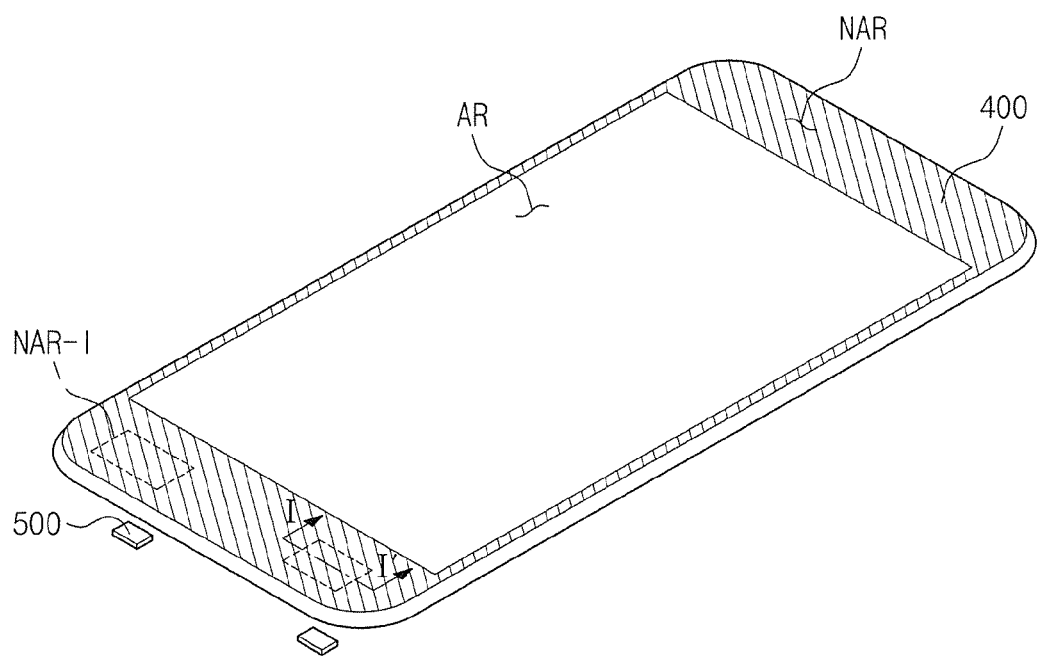
Figure 4:
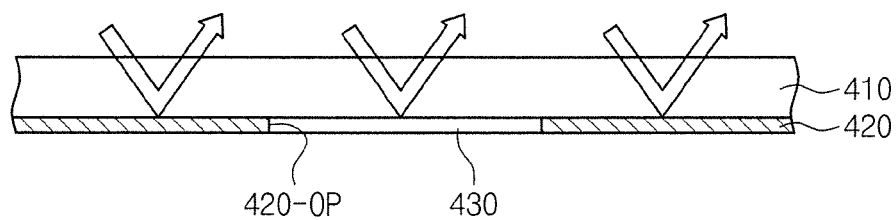
Figure 5:
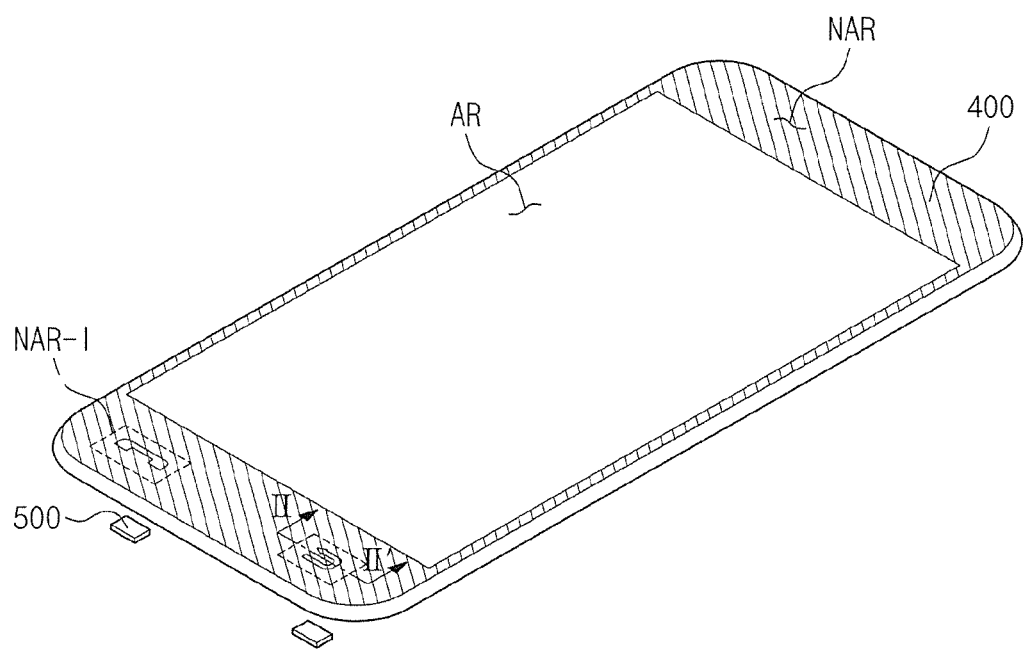
Figure 6:
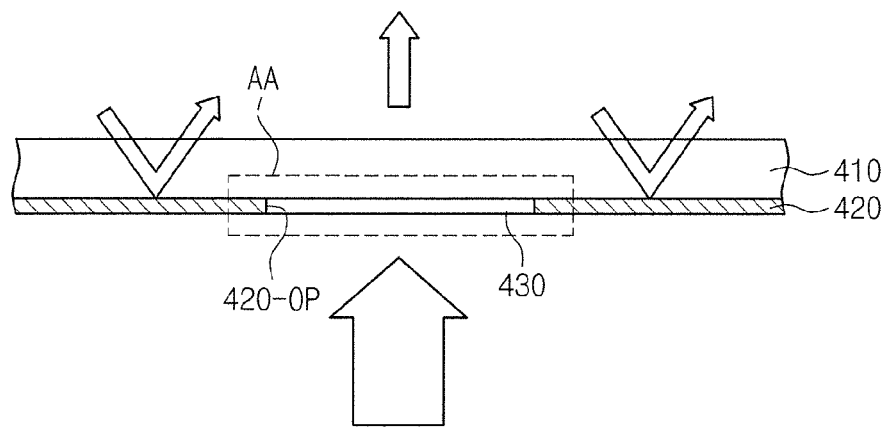
Figure 7:
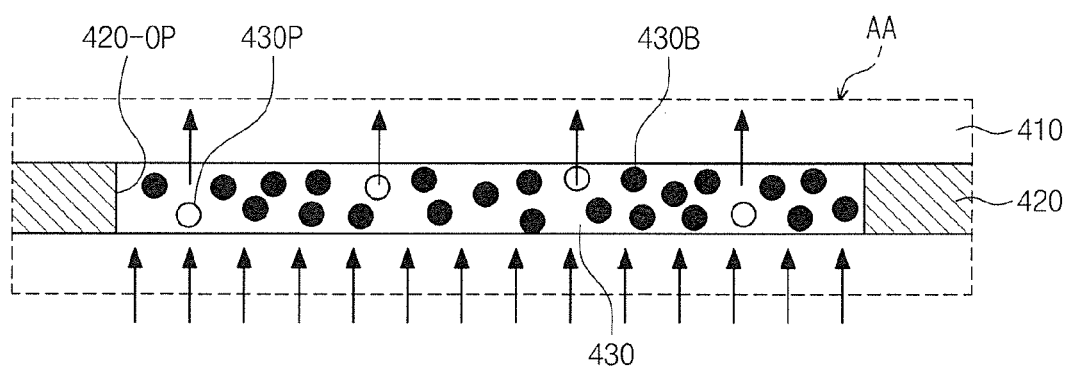

FIG. 3 is a perspective view illustrating the outward appearance of a window substrate when operating the display device shown in FIG. 1 in a first mode, and FIG. 4 is a cross sectional view taken along a line I-I' of FIG. 3. FIG. 5 is a perspective view illustrating the outward appearance of a window substrate displayed when operating the display device shown in FIG. 1 in a second mode, and FIG. 6 is a cross sectional view taken along a line II-II' of FIG. 5. FIG. 7 is an enlarged cross sectional view of a portion AA of FIG. 6.

Hereinafter, the window substrate 400 will be described in more detail with reference to FIGS. 3, 4, 5, 6, and 7.

According to one embodiment of the present invention, the window substrate 400 includes a base substrate 410, a light shielding layer 420 provided with at least one opening 420-OP, and a filter layer 430.

The base substrate 410 may be a transparent, plate-shaped substrate. In a plan view, the base substrate 410 includes a display region AR, which the image can be transmitted through, and a non-display region NAR disposed adjacent to at least one portion of the display region AR.

As shown in FIGS. 3 and 5, the display region AR may be enclosed (or surrounded or bordered) with the non-display region NAR, but embodiments of the present invention may not be limited thereto. For example, in a plan view, the non-display region NAR may include two separate regions spaced apart from each other by the display region AR.

The base substrate 410 may include a glass or a plastic. For example, the base substrate 410 may be formed of a tempered glass or a transparent reinforced plastic (e.g., polycarbonate).

The light shielding layer 420 may be disposed on one surface of the base substrate 410 to cover at least one portion of the non-display region NAR. The light shielding layer 420 may be formed of a material capable of absorbing or reflecting a light incident from the other (or opposite) surface of the base substrate 410.

The light shielding layer 420 may include at least one opening 420-OP. In some embodiments, as shown, for example, in FIGS. 3 and 5, the light shielding layer 420 includes two openings 420-OP and covers the entire region of the non-display region NAR, but embodiments of the present invention are not limited thereto.

According to example embodiments of the present invention, a planar shape of the opening 420-OP may be variously modified. For example, in a plan view, the opening 420-OP may be formed to have a shape (e.g., a graphical shape) indicating a specific function (e.g., a telephone-receiver-shaped opening or an arrow-shaped opening) or a letter shape. In some embodiments, the opening 420-OP may be perceived by a user as an input icon.

According to one embodiment of the present invention, the filter layer 430 is disposed on one surface of the base substrate 410 provided with the light shielding layer 420 and is aligned with the opening 420-OP of the light shielding layer 420. The filter layer 430 may be configured to partially transmit light (hereinafter referred to as "internal light") emitted from the light source 500 toward the opening 420-OP (e.g., light passing through the opening).

In some embodiments of the present invention, the opening 420-OP is filled with the filter layer 430. The formation of the filter layer 430 may include forming a filtering material on a portion of the light shielding layer 420 (e.g., in the opening 420-OP) and then drying the filtering material. In some embodiments, the filter layer 430 may extend from the opening 420-OP and cover the light shielding layer 420 around the opening 420-OP.

According to one embodiment of the present invention, as shown in FIG. 7, the filter layer 430 may include a plurality of first particles 430B and a plurality of second particles 430P. The first particles 430B may be formed of a material capable of blocking the transmission of light, and the second particles 430P may be formed of a material capable of transmitting light. In addition, the filter layer 430 may further include an additive, such as a surfactant, an adhesive, and so forth.

If the internal light is not incident on the opening 420-OP, it may be difficult for a user to perceive the opening 420-OP, as shown in FIG. 3. The filter layer 430 may reflect most of the light (hereinafter referred to as "external light") incident from the exterior into the opening 420-OP (e.g., light passing through the opening). Even if a part of the external light passes through the filter layer 430, an intensity of the part of the external light passing through the filter layer 430 may be very low compared with an intensity of the internal light, and therefore, it may be difficult for a user to perceive the opening 420-OP.

In some embodiments, the first particle 430B may have substantially the same color as the light shielding layer 420. That is, the first particle 430B may be formed of a material displaying (or that reflects) substantially the same color as that realized (e.g., displayed or reflected) by the light shielding layer 420. In this case, it may be hard for the user to perceive the opening 420-OP. However, embodiments of the present invention are not limited to the case that the first particle 430B has the same color as the light shielding layer 420. In other words, the first particle 430B may have a different color from the light shielding layer 420.

For instance, the light shielding layer 420 may be formed of a material having (e.g., displaying or reflecting) one color of black, white, red, green, or brown, while the first particle 430B may be formed of a material having the same color as the light shielding layer 420 but having a brightness or a chroma different from the light shielding layer 420. In other embodiments, the above described effect can be obtained from, for example, the window substrate 400 including a black light shielding layer 420 and a brown or navy first particles 430B.

When the internal light is incident into the opening 420-OP as shown in FIG. 6, the opening 420-OP may be perceived by a user as an input icon, as shown in FIG. 5.

As shown in FIG. 7, the first particles 430B may block transmission of the internal light, but the substantially transparent second particles 430P may allow transmission of the internal light.

When the light source 500 generates a light with a substantially uniform intensity, the intensity of the internal light which is emitted from the base substrate 410 through the filter layer 430, may depend on a ratio of the first particles 430B to the second particles 430P.

For instance, in the case in which the number of second particles 430P far outnumbers the number of first particles 430B, transmission of the external light may be increased. As a result, the opening 420-OP may be perceived as an input icon by the external user, even when the internal light is not generated.

For example, if the first particles 430B are black, a weight ratio of the first particles 430B to the second particles 430P may be in a range of 8:1 to 12:1. In this case, about 0.1% to about 0.27% of the internal light may be transmitted through the filter layer 430.

However, the above mentioned range or ratio may be valid in the case that the first particles 430B are black. In other embodiments of the present invention, a ratio of the first particles 430B to the second particles 430P may vary depending on color of the first particles 430B.

In other embodiments, the first particles 430B may be white. In this case, the weight ratio of the first particles 430B to the second particles 430P may be in a range of 1.5:1 to 2.5:1, and about 0.3% to about 1.2% of the internal light may be transmitted through the filter layer 430.

Figure 8:
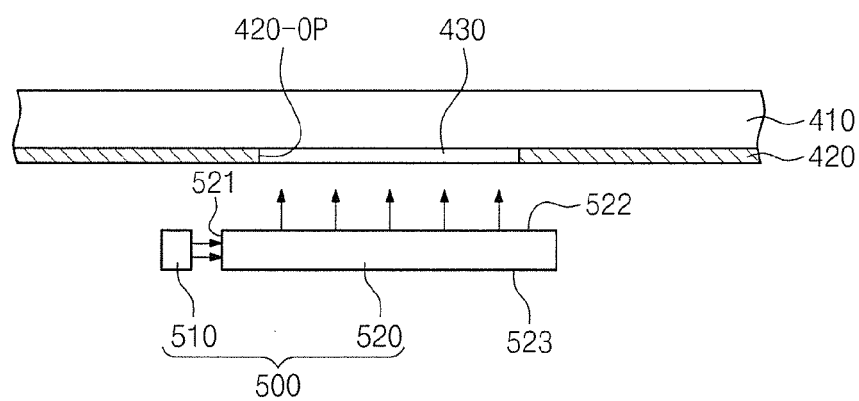

FIG. 8 is a cross sectional view illustrating a portion of a display device according to other example embodiments of the present invention. Hereinafter, a display device according to embodiments of the present invention will be described in more detail with reference to FIG. 8. For the sake of convenience, components previously described with reference to FIGS. 1 through 7 may be identified by like reference numbers without repeating descriptions thereof.

According to one embodiment of the present invention, the light source 500 of the display device includes a light emitting device 510 and a light guide plate 520. The light guide plate 520 is disposed below the light shielding layer 420 to face the opening 420-OP or the input icon region NAR-I, and the light emitting device 510 may be disposed at one side of the light guide plate 520.

In some embodiments of the present invention, the light emitting device 510 is a light emitting diode. The light emitting diode may generate light (hereinafter referred to as "originating light") in response to an operating voltage supplied from the exterior (e.g., a power source). The light emitting diode may be a semiconductor device having, for example, low power consumption, an increased luminous intensity, and a long lifetime.

The light emitting diode may be mounted on a PCB in a form of package and then installed in the housing 200.

The light guide plate 520 may be configured to guide the originating light to the opening 420-OP, for example, with a spatially uniform (or substantially uniform) intensity.

The light guide plate 520 may be shaped like a tetragonal (e.g., rectangular or square) plate. The light guide plate 520 may be formed of a transparent material having enhanced mechanical strength and enhanced heat resistance. For example, the light guide plate 520 may be formed of polycarbonate or acrylic resin.

The light guide plate 520 may have a side surface 521 adjacent to the light emitting device 510, an emitting surface 522 facing the filter layer 430, and a reflective surface 523 facing and parallel to the emitting surface 522.

The originating light may be incident into the light guide plate 520 through the side surface 521 and then be emitted to the exterior of the light guide plate 520 through the emitting surface 522 directly or after being reflected by the reflective surface 523.

Figure 9:
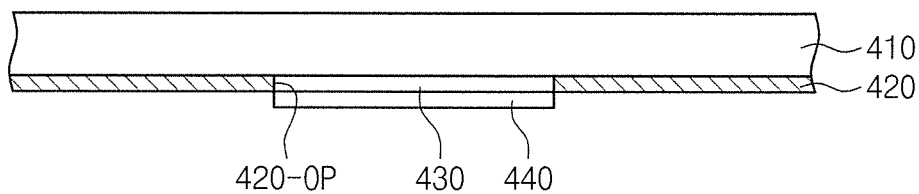

FIG. 9 is a sectional view illustrating a portion of a display device according to still other example embodiments of the present invention. Hereinafter, a display device according to one embodiment of the present invention will be described in more detail with reference to FIG. 9. For the sake of convenience, components previously described with reference to FIGS. 1 through 7 may be identified by like reference numbers without repeating descriptions thereof.

According to the present embodiments, the window substrate 400 may further include a first color layer 440.

The first color layer 440 is disposed on a surface of the base substrate 410 provided with the filter layer 430 and is aligned to face the filter layer 430. Due to the presence of the first color layer 440, the internal light incident toward the opening 420-OP may have a first color. In other words, the first color layer 440 may cause a light having a specific color to pass therethrough.

For example, in the case in which the first color layer 440 has a red color, the internal light has the red color after passing through the first color layer 440. The red light may pass through the filter layer 430 and be perceived as a red image by a user.

In other embodiments of the present invention, a color of a light generated from the light source 500 may be different from a color of the first color layer 440. For example, the light source 500 may generate blue light and the first color layer 440 may have a yellow color, and in this case, light emitted from the opening 420-OP may have a substantially white color or a white-like color.

Figure 10:
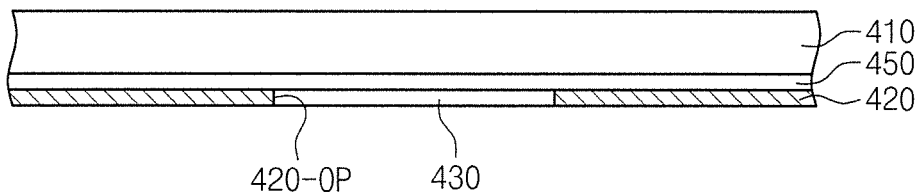

FIG. 10 is a sectional view illustrating a portion of a display device according to yet other example embodiments of the present invention. Hereinafter, a display device according to embodiments of the present invention will be described in more detail with reference to FIG. 10. For the sake of convenience, components previously described with reference to FIGS. 1 through 7 may be identified by like reference numbers without repeating descriptions thereof.

According to embodiments of the present invention, the window substrate 400 may further include a second color layer 450 interposed between the base substrate 410 and the light shielding layer 420. The second color layer 450 may have a chromatic color, such as white, red, green, and so forth.

In a plan view, the second color layer 450 may have a shape corresponding to that of the light shielding layer 420. In more detail, the second color layer 450 may be disposed on a surface of the base substrate 410 to have the substantially same shape as the non-display region NAR. The light shielding layer 420 may be disposed on the second color layer 450 to have the substantially same shape as the second color layer 450. In other words, as shown in FIG. 10, the second color layer 450 and the light shielding layer 420 may be sequentially stacked on a surface of the base substrate 410.

According to some aspects of embodiments of the present invention, a color perceived by a viewer may be determined by a color of the second color layer 450. Furthermore, the external light may be partially or fully blocked by the second color layer 450, and a portion of the external light passing through the second color layer 450 may be blocked by the light shielding layer 420.

In some embodiments of the present invention, the first particles 430B in the filter layer 430 may be formed of a material capable of displaying the substantially same color as that realized by the second color layer 450.

In some embodiments of the present invention, the second color layer 450 may have an opening, which is formed to face the opening 420-OP of the light shielding layer 420. Here, the opening of the second color layer 450 may be filled with the filter layer 430.

According to embodiments of the present invention, a window substrate for a display device is configured to be able to display at least one input icon. The input icon may be defined by the opening provided in the light shielding layer. The window substrate 400 may include a filter layer 430, which is disposed on the opening to allow partial transmission of an incident light.

According to some aspects of the present invention, a display device includes the window substrate. Here, the input icon may be perceived by a viewer only when the device is operated in a specific mode.

While embodiments of the present invention have been particularly shown and described, it will be understood by one of ordinary skill in the art that variations in form and detail may be made therein without departing from the spirit and scope of the attached claims, and equivalents thereof.

What is claimed is:

1. A window substrate for a display device, comprising:
   a base substrate comprising a display region and a non-display region adjacent to at least one portion of the display region;
   a light shielding layer on the base substrate and facing at least one portion of the non-display region, the light shielding layer having at least one opening; and
   a filter layer on the base substrate and facing the opening, the filter layer being adapted to transmit a portion of a light passing through the opening, the filter layer comprising:
   a plurality of first particles adapted to block the incident light, at least one of the first particles being separated from others of the first particles; and
   a plurality of second particles adapted to transmit the incident light.

2. The window substrate of claim 1, wherein the first particles and the light shielding layer have substantially the same color as each other.

3. The window substrate of claim 1, wherein the first particles have a black color, and a weight ratio of the first particles to the second particles is in a range from 8:1 to 12:1.

4. The window substrate of claim 1, wherein the first particles have a white color, and a weight ratio of the first particles to the second particles is in a range from 1.5:1 to 2.5:1.

5. The window substrate of claim 1, further comprising a color layer interposed between the base substrate and the light shielding layer.

6. The window substrate of claim 5, wherein the first particles and the color layer have substantially the same color as each other.

7. The window substrate of claim 1, further comprising a color layer on the base substrate, the color layer facing the filter layer and adapted to filter a color of the incident light.

8. The window substrate of claim 1, wherein the base substrate comprises a tempered glass or a reinforced plastic.

9. The window substrate of claim 1, wherein the light shielding layer is directly on the base substrate and has substantially the same planar shape as the non-display region.

10. A display device comprising:
    a display panel configured to display an image;

a housing configured to contain the display panel;
a touch panel on the display panel; and
a window substrate on the touch panel,
wherein the window substrate comprises:
a base substrate comprising a display region configured to transmit the image and a non-display region adjacent to at least one portion of the display region;
a light shielding layer on a bottom surface of the base substrate and facing at least one portion of the non-display region, the light shielding layer having at least one opening; and
a filter layer on the bottom surface of the base substrate facing the opening, the filter layer being adapted to transmit a portion of a light incident on the opening.

11. The display device of claim 10, further comprising a light source portion in the housing and configured to generate the incident light.

12. The display device of claim 11, wherein the light source portion comprises:
a light emitting device adapted to generate an originating light; and
a light guide plate adapted to guide the originating light toward the window substrate, wherein the incident light comprises a portion of the originating light emitted from the light guide plate.

13. The display device of claim 10, wherein the filter layer comprises:
a plurality of first particles adapted to block the incident light; and
a plurality of second particles adapted to transmit the incident light.

14. The display device of claim 13, wherein the first particles and the light shielding layer have substantially the same color as each other.

15. The display device of claim 13, further comprising a color layer interposed between the base substrate and the filter layer.

16. The display device of claim 15, wherein the first particles and the color layer have substantially the same color as each other.

17. The display device of claim 10, further comprising a color layer on the surface of the base substrate, facing the filter layer and adapted to filter a specific color of the incident light.

18. The display device of claim 10, wherein the base substrate comprises a tempered glass or a reinforced plastic.

19. The display device of claim 10, wherein the light shielding layer is directly on the bottom surface of the base substrate and has substantially the same planar shape as the non-display region.

20. A window substrate for a display device, comprising:
a base substrate including a display region and a non-display region adjacent to the display region;
a light shielding layer on the base substrate and overlapped with the non-display region, the light shielding layer having an opening; and
a filter layer configured to fill the opening and to transmit a portion of an incident light to the opening, the filter layer comprising:
a plurality of first particles configured to block another portion of the incident light, at least one of the first particles being separated from others of the first particles; and
a plurality of second particles configured to transmit the portion of the incident light.

21. The window substrate of claim 20, wherein the filter layer and the opening have a substantially identical shape, and the filter layer and the light shielding layer are disposed on the same layer.

22. The window substrate of claim 20, wherein the filter layer comprises:
a first portion having the same shape as the opening and filling the opening; and
a second portion being connected to the first portion and overlapping the light shielding layer.

23. The window substrate of claim 20, wherein the first particles and the light shielding layer have a substantially identical color.

24. The window substrate of claim 20, further comprising a color layer interposed between the base substrate and the light shielding layer.

25. The window substrate of claim 24, wherein the first particles and the color layer have a substantially identical color.

26. The window substrate of claim 20, further comprising a color layer on and overlapped with the filter layer and configured to change a color of the incident light.

27. A display device comprising:
a display panel configured to display an image;
a touch panel on the display panel;
a window substrate on the touch panel; and
a light source portion configured to provide an incident light to the window substrate,
wherein the window substrate comprises:
a base substrate including a display region configured to transmit the image and a non-display region adjacent to the display region;
a light shielding layer on a bottom surface of the base substrate and overlapped with the non-display region, the light shielding layer having an opening; and
a filter layer configured to fill the opening and to transmit a portion of the incident light.

28. The display device of claim 27, wherein the filter layer comprises:
a plurality of first particles configured to block another portion of the incident light; and
a plurality of second particles configured to transmit the portion of the incident light.

29. The display device of claim 28, wherein the first particles and the light shielding layer have a substantially identical color.

30. The display device of claim 28, further comprising a color layer interposed between the base substrate and the filter layer.

31. The display device of claim 30, wherein the first particles and the color layer have a substantially identical color.

32. The display device of claim 27, further comprising a color layer on and overlapped with the filter layer, and configured to change a color of the incident light.

* * * * *